July 9, 1963 T. E. ROST 3,096,786
SAFETY CUTOFF VALVE
Filed July 31, 1961
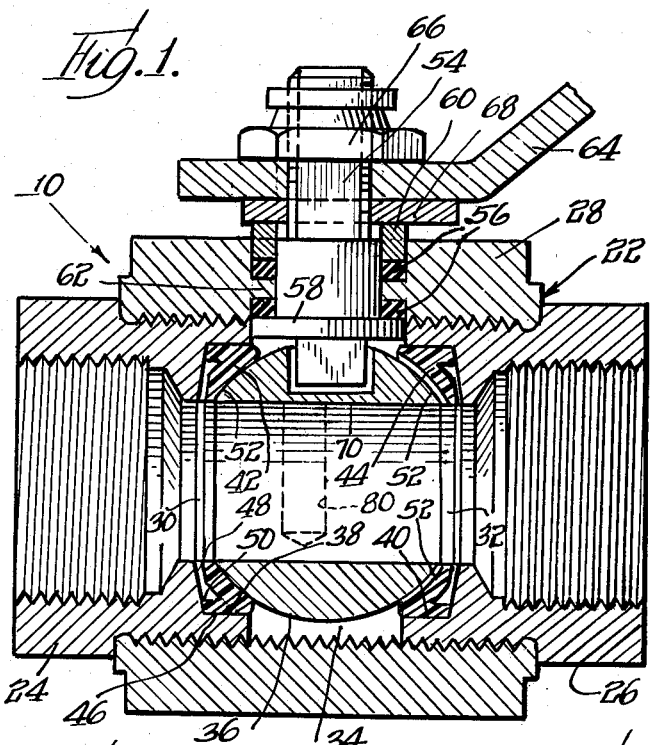
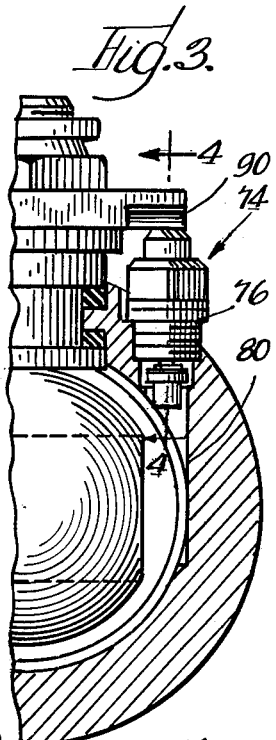
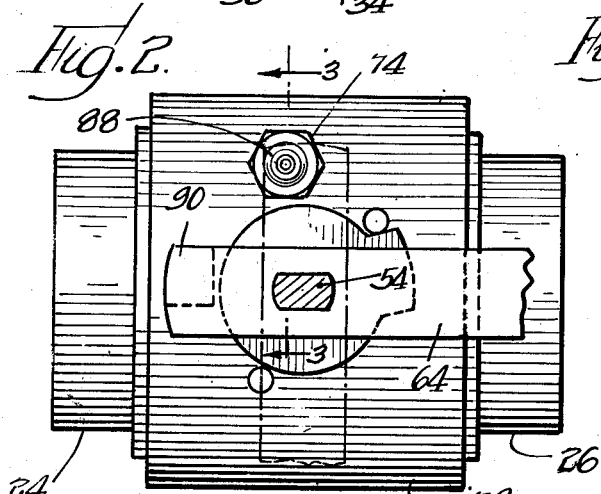
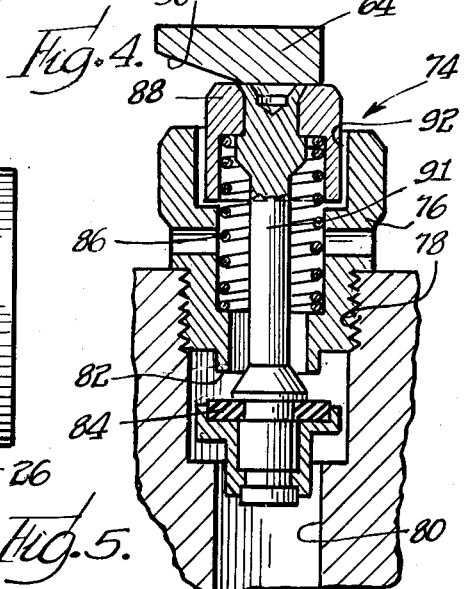
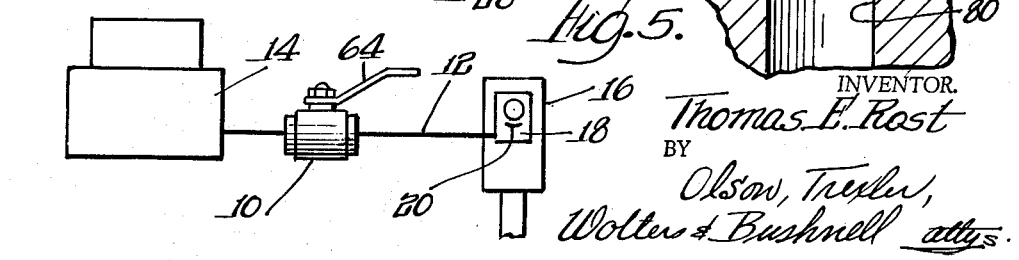
INVENTOR.
Thomas E. Rost
BY
Olson, Trexler,
Wolter & Bushnell attys.

United States Patent Office 3,096,786
Patented July 9, 1963

3,096,786
SAFETY CUTOFF VALVE
Thomas E. Rost, Crystal Lake, Ill., assignor to Hills-Mc-Canna Company, Chicago, Ill., a corporation of Illinois
Filed July 31, 1961, Ser. No. 127,950
2 Claims. (Cl. 137—596.2)

The present invention relates to valves.

One object of the invention is to provide a new and improved safety cutoff valve for use in compressed air supply lines to pneumatic tools and the like.

Another object is to provide for use in compressed air supply lines or the like a safety cutoff valve having a new and improved construction well adapted for exceptionally economical manufacture, and providing inherent operating efficiency and dependability in the use of the valve, which when open provides for a free flow of fluid through the valve without leakage, and which when closed completely cuts off the flow of fluid from the upstream side of the valve and automatically bleeds fluid from passages connected to the downstream side of the valve to release back pressure on the valve.

Another object is to provide a safety cutoff valve of the character recited which effects as an incident to closing of the valve an automatic bleeding off of back pressure on the valve by means of an improved valve construction which affords very material economies in manufacture while at the same time providing great reliability in operation.

Other objects and advantages will become apparent from the following description of the exemplary embodiment of the invention illustrated in the drawings, in which:

FIGURE 1 is a longitudinal sectional view of the valve, showing the valve in its open position;

FIG. 2 is a plan view of the valve of FIG. 1;

FIG. 3 is a transverse sectional view taken along the irregular line 3—3 of FIG. 2, and showing the valve in its closed position;

FIG. 4 is a fragmentary view on an enlarged scale taken generally along the line 4—4 of FIG. 3; and FIG. 5 is a schematic illustration of a pneumatic system incorporating the valve of FIGS. 1 to 4.

Referring to the drawings in greater detail, the safety cutoff valve 10 forming the illustrated embodiment of the invention is inherently suited for use in an air supply line 12, FIG. 5, extending from a source 14 of compressed air to a pneumatic tool 16. As illustrated schematically in FIG. 5, the pneumatic tool 16 is a jackhammer which is controlled by means of a control valve 18 operated by a handle 20 on the tool.

When the pneumatic tool 16 is in use, the cutoff valve 10 is open and provides a continuous supply of air to the control valve for the tool. In the event that use of the tool 16 is to be discontinued for an appreciable period of time, or if the tool is to be disconnected from the supply line 12, the cutoff valve 10 is closed.

As will presently appear, the valve 10, which operates when open to provide an unrestricted flow of compressed air to the downstream side of the valve, operates automatically as an incident to closure of the valve, not only to completely block the further supply of compressed air from the upstream side of the valve, but to immediately bleed off the back pressure on the downstream side of the cutoff valve. In this connection, it will be appreciated that the passages and spaces connected with the downstream side of the cutoff valve 10 are filled with air under pressure immediately prior to closure of the valve 10. It will be appreciated that continued maintenance of air under pressure in the passages leading from the cutoff valve 10 to a pneumatic device when a supply of air under pressure is not needed for operating the device can create a hazardous condition.

Looking to FIGS. 1 to 4 of the drawings, the valve 10 comprises a main valve body 22 formed as shown by three component elements threaded together. Thus, two end elements or sections 24, 26 of the body are threaded into opposite ends of an internally threaded central element or section 28 of the body which has a generally cylindrical shape over-all.

The two end elements 24, 26 respectively define inlet and outlet passages 30, 32 opening into the upstream and downstream sides respectively of a valve chamber 34 defined within the central valve element 28. As shown, the body element 24 is internally threaded to connect with a conduit or line leading from a source of compressed air, and the valve element 26 is internally threaded to receive a discharge or downstream conduit.

A centrally bored flow control ball 36 is rotatably disposed within the valve chamber 34 between the inlet and outlet passages 30, 32.

The inner ends of the valve body end elements 24, 26 define annular recesses 38, 40 encircling the respective passages 30, 32 and providing space for receiving two annular valve seats 42, 44. Preferably, each of the seats 42, 44 is formed of an annular ring of polytetrafluoroethylene or other material, such, for example, as another one of the fluoro carbons having somewhat similar physical properties. Preferably, each valve seat 42, 44 is shaped to have a generally triangular form in transverse section. The shape of the seat 42 and the support provided to the seat 42 is typical for both seats.

As shown, the seat 42 defines a generally cylindrical outer peripheral surface 46 which is closely encircled by structure of the end element 24 defining the recess 38. From its outer periphery, which is closely embraced by the end element 24, the seat 42 cantilevers radially inward. The portion of the seat 42 which cantilevers radially inward is initially spaced from a side surface 48 of the recess 38. A V-shaped annular notch 50 cut into the radial side of the seat 42 generally opposite from the ball 36, as shown in FIG. 1, has a radial spacing from the radially outward periphery of the seat which is substantially less than the radial spacing of the notch from the radially inward periphery of the seat.

The annular portion of the seat 42 which confronts the ball 36 defines an annular ball sealing surface 52 which is held in tight sealing engagement with the ball when the ball is turned into its closed valve position, not only by the reaction of the ball against the seat, but also by the action of fluid pressure on the upstream side of the ball, tending to flex the valve seat toward the ball.

In this connection, it will be appreciated that the initial axial spacing between the cantilevering portion of the seat 42 and the recessed surface 48 allows high pressure fluid to act within the annular notch 50 and on the portion of the seat extending radially inward from the notch. The result is to hold the seat tight against the ball by the action of fluid pressure on the seat.

The seat 44 on the downstream side of the ball 36 is similar to the previously described upstream seat 42 except for the formation of circumferentially spaced grooves 52 in the ball confronting face of the seat 44. These grooves are designed to provide continuous communication between the valve chamber 34 on the downstream side of the upstream seat 42, and the downstream or outlet passage 32, which continues even when the valve is closed. As will presently appear, the continuous communication thus provided between the outlet passage 32 and the chamber 34 is used in bleeding back pressure from the valve when it is closed.

The ball 36 is rotated between its valve open and its valve closed positions by means of a valve stem 54 extending radially through the body element 28 into driving engagement with the ball. The stem 54 is sealed against the escape of fluid from the chamber 34 by means of seals 56 interposed between an internal flange 58 on the stem and an external gland 60 to be clamped against an intervening annular ledge 62 on the body element 28.

The main valve stem 54 is rotated by means of a handle lever 64 non-rotatably mounted on the stem 54 and clamped between a nut 66 and a throw plate 68 which is interposed between the handle and the gland 60.

Turning of the ball 36 to its open valve position provides for the free passage of fluid through the ball bore 70 between the inlet and outlet passages 30, 32.

Upon turning of the ball to its closed position, the inlet passage 30 is blocked by the sealing action of the seat 42 on the ball.

Rotation of the ball to its closed position effects an automatic release of fluid from the valve chamber 34 to bleed back pressure from the valve. This is achieved by means of a bleed valve 74 which is automatically opened as an incident to turning of the ball to closed position.

The bleed valve 74 itself has a simple and inherently economical construction. Basically it comprises a bleed valve body 76 which is threaded into a threaded counterbore 78 in a bore 80 formed in the body section 28 in spaced parallel relation to the main valve stem 54 and extending into intersecting relation to the valve chamber 34, as shown in FIGS. 1, 3 and 4.

The inner end of the bleed valve body defines an annular seat 82 which is opposed by a closure element 84 urged toward the seat 82 by a compression spring 86 mounted within the body 76 and acting on a pressure cap 88 secured to the outer end of a stem 91 connected to the valve closure element 84, as shown in FIG. 4.

When the ball 36 is turned to its open position, the bleed valve 74 is closed by the spring 86. The pressure of fluid within the chamber 34 urges the element 84 harder against the seat 82 to block the escape of fluid through the bleed valve.

The end of the lever 64 opposite from the handle end of this lever projects beyond the stem 54 and is shaped to form a downwardly facing cam 90 which is swung across the pressure cap 88 on the outer end of the bleed valve stem 91 as an incident to turning of the handle lever to close the main valve. The cam 90 is shaped to depress the stem 91 and open the bleed valve to permit the escape of fluid from the valve chamber 34 and the release of back pressure from spaces connected to the downstream side of the closed valve.

Turning of the handle 64 to open the valve 10 swings the cam 90 away from the stem 91 of the bleed valve 74, allowing the bleed valve to close automatically, as described.

It will be noted that the pressure cap 88 of the bleed valve 74 protrudes outwardly from the bleed valve body 76, but at the same time extends down into a well 92 within the body 76, whereby the pressure cap 88 is supported against the reaction of side thrust applied by the cam 90 in depressing the bleed valve stem 91.

The safety cutoff valve 10 thus formed is inherently well adapted for economical manufacture and will operate efficiently and dependably over a long service life.

It will be understood that the invention is not necessarily limited to use of the precise construction illustrated but includes the use of equivalents and alternatives within the spirit and scope of the invention as defined by the claims.

The invention is claimed as follows:

1. For use in valving compressed gases, a safety cutoff valve comprising, in combination, a valve body defining a valve chamber and defining inlet and outlet passages opening into said chamber, a valve ball disposed rotatably within said chamber, means defining two annular recesses encircling the inner ends of said respective passages, an annular valve seat supported in each of said recesses, each valve seat being formed of a flexible material and cantilevering radially inward into engagement with said ball, a valve stem drivingly connected with said ball for rotating the latter between a valve open position which connects said passages and a valve closed position in which the valve seat encircling the inlet passage coacts with the ball to close said inlet passage, a handle mounted on said stem for rotating the latter, the valve seat encircling said outlet passage being shaped to provide communication between said valve chamber and said outlet passage when said valve ball is in the closed valve position thereof, a normally closed bleed valve mounted in said valve body in communication with said valve chamber and having an outlet side open to exhaust, and cam means rotatable with said handle and coacting with said bleed valve to open the latter automatically as an incident to movement of the handle to turn said valve ball to the closed valve position thereof.

2. For use in valving compressed gases, a safety cutoff valve comprising, in combination, a valve body defining a valve chamber and defining inlet and outlet passages opening into said chamber, a valve ball disposed within said chamber for rotation between open valve and closed valve positions, means defining an annular recess encircling the inner end of said inlet passage, an annular valve seat supported in said recess, said valve seat being formed of a flexible material and cantilevering radially inward into engagement with said ball to continuously seal thereagainst, means on said body defining a valve seat support encircling said outlet passage, an annular valve seat supported on said seat support in encircling relation to said outlet passage and engaging said ball to continuously support the ball, a valve stem drivingly connected with said ball for rotating the latter between said valve open position in which the ball connects said passages and said valve closed position in which the valve seat encircling the inlet passage coacts with the ball to close said inlet passage, a handle mounted on said stem for rotating the latter, the valve seat encircling said outlet passage being shaped to provide communication between said valve chamber and said outlet passage when said valve ball is in the valve closed position thereof, a normally closed bleed valve mounted in said valve body in communication with said valve chamber and having an outlet side open to exhaust, and cam means rotatable with said handle and coacting with said bleed valve to open the latter automatically as an incident to movement of the handle to turn said valve ball to the closed valve position thereof.

References Cited in the file of this patent

UNITED STATES PATENTS

| | | |
|---|---|---|
| 1,471,115 | Farmer | Oct. 16, 1923 |
| 2,877,979 | Snyder | Mar. 17, 1959 |
| 3,030,068 | Priese | Apr. 17, 1962 |